US009896316B2

(12) United States Patent
Gonzales et al.

(10) Patent No.: US 9,896,316 B2
(45) Date of Patent: Feb. 20, 2018

(54) END EFFECTOR FOR A TRANSPORT DEVICE FOR THE MOVEMENT OF PARENT ROLLS OF CONVOLUTELY WOUND WEB MATERIALS

(71) Applicant: The Procter & Gamble Company, Cincinnati, OH (US)

(72) Inventors: Christopher Nicholas Gonzales, Pleasant View, UT (US); Eugene Harold Lessen, Jr., Pleasant View, UT (US); Edward L. McGinley, Clarks Summit, PA (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/415,127

(22) Filed: Jan. 25, 2017

(65) Prior Publication Data

US 2018/0002151 A1 Jan. 4, 2018

Related U.S. Application Data

(60) Provisional application No. 62/356,782, filed on Jun. 30, 2016.

(51) Int. Cl.
*B65G 47/24* (2006.01)
*B66F 9/12* (2006.01)
(Continued)

(52) U.S. Cl.
CPC ................ *B66F 9/125* (2013.01); *B66F 9/18* (2013.01); *B65G 47/14* (2013.01)

(58) Field of Classification Search
CPC .... B65G 7/00; B65G 7/12; B65G 2201/0276; B65G 1/0442; B65G 47/14; B65G 47/248; B66F 11/00
(Continued)

(56) References Cited

U.S. PATENT DOCUMENTS 1,874,904 A 8/1932 Crafts
2,714,463 A 8/1955 Fraser
(Continued)

FOREIGN PATENT DOCUMENTS

AU 7360355 A 9/1973
CA 2226040 A1 12/1997
(Continued)

OTHER PUBLICATIONS

U.S. Appl. No. 15/415,074, filed Jan. 25, 2017, Christopher Nicholas Gonzales, et al.

(Continued)

*Primary Examiner* — James R Bidwell
(74) *Attorney, Agent, or Firm* — Sarah M. DeCristofaro

(57) ABSTRACT

An end effector for a transport device for the movement of parent rolls of convolutely wound web materials is disclosed. The end effector comprises a frame, first and second radial members operably connected to the frame, a first core plug operably connected to the first longitudinal member, and a second core plug operably connected to the second longitudinal member. A first core plug extensible from a first position to a second position relative to the first longitudinal member and a second core plug extensible from a first position to a second position relative to the second longitudinal member are capable of cooperative and penetrating engagement with a core of the parent roll.

20 Claims, 16 Drawing Sheets

(51) Int. Cl.
*B66F 9/18* (2006.01)
*B65G 47/14* (2006.01)

(58) Field of Classification Search
USPC .............. 198/409, 414, 377.07, 377.03, 379, 198/377.02; 414/619, 910, 911
See application file for complete search history.

(56) References Cited

U.S. PATENT DOCUMENTS

| | | | | |
|---|---|---|---|---|
| 2,815,878 | A | 12/1957 | Vance | |
| 2,981,429 | A | 4/1961 | Williamson | |
| 3,134,620 | A | 5/1964 | Blaisdell | |
| 3,332,715 | A | 7/1967 | Hickman et al. | |
| 3,730,368 | A | 5/1973 | Dalglish | |
| 3,734,328 | A | 5/1973 | Dalflish | |
| 3,753,505 | A | 8/1973 | Ouska | |
| 3,758,144 | A | 9/1973 | Dalglish | |
| 3,771,666 | A | 11/1973 | Fournier | |
| 4,090,624 | A | 5/1978 | Krein et al. | |
| 4,120,405 | A | 10/1978 | Jones et al. | |
| 4,154,470 | A | 5/1979 | Dalglish | |
| 4,279,567 | A | 7/1981 | Thompson | |
| 4,358,143 | A | 11/1982 | Cullen | |
| 4,687,244 | A | 8/1987 | Cullen et al. | |
| 4,718,813 | A | 1/1988 | Kehlenbach | |
| 4,784,398 | A | 11/1988 | Lund | |
| 4,863,335 | A | 9/1989 | Herigstad et al. | |
| 4,941,798 | A * | 7/1990 | Meier | B65H 19/123 294/93 |
| 5,192,003 | A | 3/1993 | Pipes | |
| 5,308,217 | A | 5/1994 | Pienta | |
| 5,316,436 | A * | 5/1994 | Main | B23P 6/00 414/772 |
| 5,513,944 | A | 5/1996 | Cullen et al. | |
| 5,688,009 | A | 11/1997 | Pienta | |
| 5,697,756 | A | 12/1997 | Wheaton | |
| 5,938,392 | A | 8/1999 | Duck | |
| 5,947,407 | A | 9/1999 | Quigley | |
| 6,010,171 | A | 1/2000 | Margiottiello | |
| 6,022,183 | A | 2/2000 | Walters et al. | |
| 6,276,628 | B1 | 8/2001 | Focke | |
| 6,443,688 | B1 * | 9/2002 | Komdeur | B65G 7/08 280/47.12 |
| 6,789,995 | B1 * | 9/2004 | Manzi | B21C 47/24 212/317 |
| 9,701,503 | B2 * | 7/2017 | Yamada | B65H 31/26 |
| 2002/0054811 | A1 | 5/2002 | Lofgren | |
| 2003/0002971 | A1 | 1/2003 | Gibson | |

FOREIGN PATENT DOCUMENTS

| | | | |
|---|---|---|---|
| CA | 2845369 | A1 | 9/2014 |
| CN | 201713269 | U | 1/2011 |
| CN | 202609567 | U | 12/2012 |
| CN | 204211427 | U | 3/2015 |
| CN | 204237513 | U | 4/2015 |
| DE | 2118260 | A1 | 10/1978 |
| DE | 2544752 | B2 | 1/1979 |
| DE | 2903696 | A1 | 8/1979 |
| DE | 20201163 | U1 | 4/2002 |
| DE | 10201246 | A1 | 7/2003 |
| EP | 0055195 | A1 | 6/1982 |
| EP | 0321887 | A2 | 6/1989 |
| EP | 1195347 | A1 | 4/2002 |
| EP | 1900677 | A2 | 3/2008 |
| FI | 884640 | A | 4/1989 |
| FR | 2509272 | A1 | 1/1983 |
| FR | 2503678 | B1 | 1/1986 |
| FR | 2728885 | B1 | 2/1997 |
| FR | 2736337 | B1 | 8/1997 |
| FR | 2780049 | A3 | 12/1999 |
| FR | 2893319 | B1 | 2/2008 |
| GB | 1185632 | | 3/1970 |
| GB | 2081670 | A | 2/1982 |
| GB | 2422591 | B | 9/2008 |
| IT | BO930326 | A1 | 1/1995 |
| IT | FI20030303 | A1 | 6/2005 |
| JP | 03115098 | A | 5/1991 |
| JP | H0332529 | A | 5/1991 |
| JP | 9255274 | A | 9/1997 |
| JP | 2003020190 | A | 1/2003 |
| JP | 2003020191 | A | 1/2003 |
| KR | 100820589 | B1 | 4/2008 |
| KR | 20130121577 | A | 11/2013 |
| SU | 1126535 | A1 | 11/1984 |
| WO | WO 94/25388 | A1 | 11/1994 |
| WO | WO06102527 | A2 | 9/2006 |
| WO | WO2007/129782 | A1 | 11/2007 |
| WO | WO 2008/010251 | A1 | 1/2008 |
| ZA | 9810195 | | 4/1999 |

OTHER PUBLICATIONS

U.S. Appl. No. 15/415,787, filed Jan. 25, 2017, Christopher Nicholas Gonzales, et al.

* cited by examiner

END EFFECTOR FOR A TRANSPORT DEVICE FOR THE MOVEMENT OF PARENT ROLLS OF CONVOLUTELY WOUND WEB MATERIALS

FIELD OF THE INVENTION

The present disclosure is directed to improvements in the devices used for the handling of parent rolls of wound web materials. In particular, the present disclosure relates to an end effector suitable for use with devices capable of moving large parent rolls of convolutely wound web materials from a first location to a second location.

BACKGROUND OF THE INVENTION

Clamps are normally required to handle paper rolls of widely-varying diameters in both vertical and horizontal orientations. A typical clamp comprises a pair of clamp arms either slidably or pivotally mounted upon a clamp frame and movable with respect to such frame selectively toward and away from each other to engage or release paper rolls of different diameters.

In the papermaking industry, it is generally known that paper to be converted into a consumer product such as paper towels, bath tissue, facial tissue, and the like is initially manufactured and wound into large rolls. By way of example only, these rolls, commonly known as parent rolls, may be on the order of 10 feet in diameter and 100 inches across and generally comprise a suitable paper wound on a core. In the usual case, a paper converting facility will have on hand a sufficient inventory of parent rolls to be able to meet the expected demand for the paper conversion as the paper product(s) are being manufactured.

However used, the compressive-type clamps, discussed supra, have numerous draw-backs. The most significant of these is the use of a compressive-type clamp for the pick-up and transport of convolutely wound web materials (e.g., a parent roll of paper) is the deformation of the cylindrical surface of the parent roll by the compressive-type clamp.

There are several factors that can contribute to the deformation of a parent roll of paper. First, because of the soft nature of the paper used to manufacture paper towels, bath tissue, facial tissue, and the like, it is common for parent rolls to become out-of-round. Second, not only the soft nature of the paper, but also the physical size of the parent rolls, the length of time during which the parent rolls are stored, and the fact that roll grabbers using these compressive-type clamps used to transport parent rolls grab them about their circumference can contribute to this problem. For example, because the weight of a parent roll is typically quite substantial, the compressive-type clamps must necessarily exert a significant amount of force upon the surface of the roll in order to maintain control of the roll during movement of the roll from one location to another.

As a result, by the time many parent rolls are placed on an unwind stand they have changed from the desired cylindrical shape to an out-of-round shape. An exemplary uncompressed parent roll is shown in FIG. 1A. An exemplary compressed parent roll due to contacting engagement of the parent roll with a compressive-type clamp is shown in FIG. 1B. As mentioned, this artifact of surface deformation is particularly exacerbated upon convolutely wound parent rolls of tissue and towel substrates such as bath tissue and paper toweling. Since these products tend to be of low basis weight and can have decorative surface architectures, any compressive force applied to the surface thereof tends to distort the shape of the parent roll. An out-of-round parent roll may not be perfectly oblong or elliptical but, rather, they may assume a somewhat flattened condition resembling a flat tire, or an oblong or egg-shape, or any other out-of-round shape depending upon the amount of force required to securely hold the parent roll.

Even only slightly out-of-round parent rolls present considerable problems. In an ideal case with a perfectly round parent roll, the feed rate of a web material coming off of a rotating parent roll can be equal to the driving speed of a surface driven parent roll. However, with an out-of-round parent roll the feed rate can likely vary from the driving speed of a surface drive parent roll depending upon the radius at the web takeoff point at any moment in time. If the rotational speed remains substantially constant, the feed rate of a web material coming off of an out-of-round parent roll will necessarily vary during any particular rotational cycle depending upon the degree to which the parent roll is out-of-round. In practice, however, parent rolls are surface driven which means that if the radius at the drive point changes, the rotational speed can also change generally causing variations in the feed rate. Since the paper converting equipment downstream of the unwind stand is generally designed to operate based upon the assumption that the feed rate of a web material coming off of a rotating parent roll will always be equal to the driving speed of the parent roll, there are problems created by web tension spikes and slackening.

Additionally, it is believed that an out-of-round parent roll produces finally wound consumer products having inconsistent desired physical characteristics. Without desiring to be bound by theory, it is believed that a compressive-type clamp used for the conventional pick-up of a parent roll of wound web material effectively removes any caliper that may have been built into the product being produced for the parent roll. It is believed that this lost caliper cannot be recovered to any large degree due to the early stage of the life of the web material that is being so compressed. This lost and unrecoverable caliper can have a deleterious effect on the finally converted web material because the desired target values of the chosen parameters will be out of range even before the converting process has begun. Net—this clearly undesirable effect on the end product can be noticed by an end user of the product.

Regardless of the amount of pressure exerted by the compressive-type clamps on the parent roll, at least one point in the rotation of the parent roll exists where the relationship between the web take off point radius and the parent roll drive point radius that results in the minimum feed rate of paper to the line. At this point, the web tension can spike since the feed rate of the web material is at a minimum and less than what is expected by the paper converting equipment downstream of the unwind stand. Similarly, there can exist at least one point in the rotation of the parent roll where the relationship between the web take off point radius and the parent roll drive point radius results in the maximum feed rate of paper to the line. At this point, the web tension can slacken since the feed rate of the web material can be at a maximum and more than what is expected by the paper converting equipment downstream of the unwind stand. Since neither condition is conducive to efficiently operating paper converting equipment for manufacturing paper products such as paper towels, bath tissue and the like, and a spike in the web tension can even result in a break in the web material requiring a paper converting line to be shut down, there clearly is a need to overcome this problem.

In particular, the fact that out-of-round parent rolls create variable web feed rates and corresponding web tension spikes and web tension slackening has required that the unwind stand and associated paper converting equipment operating downstream thereof be run at a slower speed in many instances thereby creating an adverse impact on manufacturing efficiency.

Thus, there is a long-felt need to provide a better manner for the handling of parent rolls that eliminates the problems experienced and observed by manufactures using current roll-handling technology such as the aforementioned typical compressive-type clamp arms. It would be beneficial if the long-felt need was resolved by equipment that assists in maintaining the desired cylindrical parent roll shape. It would also be beneficial if the new parent roll handling equipment also maintained better control of the parent roll during movement. Further, it would be beneficial if the new parent roll handling equipment provided greater flexibility in the options required by paper product manufacturing operations by providing a more direct interface with the dry end of parent roll production, the ability to manipulate parent roll orientation for parent storage, as well as the ability to manipulate parent roll orientation for insertion of the parent roll into a converting process.

SUMMARY OF THE DISCLOSURE

The present disclosure provides for an end effector for a transport device for the movement of parent rolls of convolutely wound web materials. The end effector comprises a frame, a first radial member operably connected to the frame, a second radial member operably connected to the frame, a first core plug operably connected to the first longitudinal member, and a second core plug operably connected to the second longitudinal member. The first radial member has a first longitudinal member operably connected thereto and extending therefrom. The second radial member has a second longitudinal member operably connected thereto and extending therefrom so that the first radial member and the second radial member being rotatable about an axis of rotation. The first core plug is extensible from a first position to a second position relative to the first longitudinal member and the second core plug is extensible from a first position to a second position relative to the second longitudinal member. The first and second core plugs are capable of cooperative and penetrating engagement with a core of the parent roll when the first core plug is disposed proximate to a first portion of the core of the parent roll and the second core plug is disposed proximate to a second portion of the core of the parent roll disposed distal from the first portion of the core of the parent roll. When the first and second core plugs are cooperatively engaged with the first and second portions of the core of the parent roll respectively, the end effector is capable of changing an orientation of the core and the parent roll from a first position to a second position by rotating the parent roll about the axis of rotation.

DETAILED DESCRIPTION

When the parent roll produced by any papermaking process (including a through-drying process for making un-creped through-dried tissue sheets) has reached its final predetermined diameter, the new reel spool is lowered into position against the incoming sheet at some point along the free span of web material disposed between web material support rolls. At the appropriate time, the sheet of web material is severed and the incoming end of the severed web material is directed back toward the new reel spool in order to attach the sheet to the new reel spool. As the sheet is transferred to the new reel spool, the finished parent roll is kicked out to continue the winding process with a new reel spool.

Next, an up-ender (not shown) can then "upend" each parent roll downstream of the reel spool. Generally, an up-ender upends each parent roll typically onto a conveyor (not shown) to position the longitudinal axis of each parent roll vertically, i.e. orthogonal, to the plane of the winding process. In practice, rolls with small axial dimensions can be upended spontaneously, while those with larger axial dimensions can be upended by an up-ender.

The upended rolls can be fed via a conveyor system towards a parent roll conveyor from which they can be singly picked up by a parent roll transporter. Generally a parent roll transporter will comprise a motivator having an end effector operatively, cooperatively, and pivotably connected thereto. An end effector suitable for cooperative and associated engagement with a motivator to provide a parent roll transporter suitable for translating and/or transporting a parent roll will be provided in greater detail infra.

Figure 2:
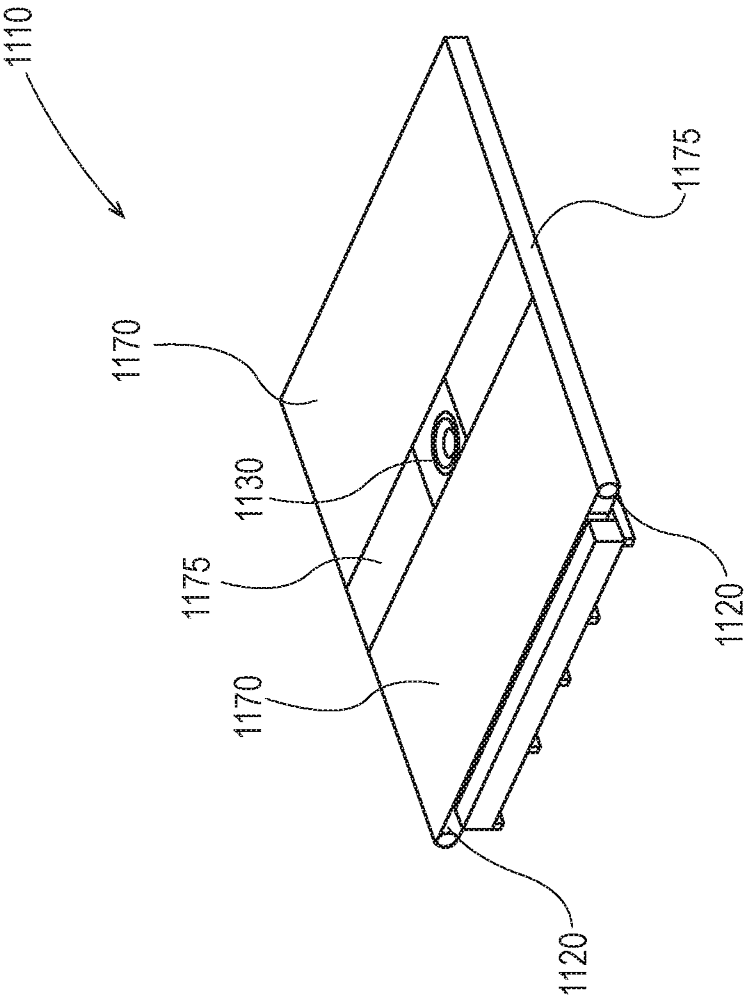
FIG. 2 is a perspective view of a platform capable of having a parent roll disposed thereupon and suitable for connection to an end effector where the platform has a core plug disposed therein.

FIG. 2 provides an exemplary platform 1110 suitable for association with an end effector of the present disclosure. Platform 1110 can be provided in a plurality of envisionable formats. In a first embodiment, platform 1110 can be provided as a conveyor comprising at least one conveyor belt 1170. It is envisioned that each of the at least one conveyor belts 1170 of platform 1110 can rotate about and be supported by a plurality of rollers 1120.

Additionally, platform 1110 can be provided with at least one secondary conveyor belt 1175. A parent roll 125 disposed upon parent roll conveyor 150 can be continuously conveyed from a first position external to parent roll transporter 1000 and end effector 1100 and into contacting engagement with the at least one conveyor belt 1170 and the at least one secondary conveyor belt 1175 of platform 1110. It is envisioned that each of the at least one secondary conveyor belts 1175 can rotate about and be supported by a plurality of rollers 1120. Secondary conveyor belts 1175 can assist with the ability to present the parent roll 125 at any orientation relative to parent roll transporter 1000. This can be beneficial by, for example, providing motive force to the portion of the parent roll disposed within the region disposed between adjacent conveyor belts forming the at least one conveyor belt 1170. This can reduce the overall drag experienced by the parent roll 120 in the region disposed between adjacent conveyor belts thus reducing any observed surface deformities of parent roll 125.

Figure 3:
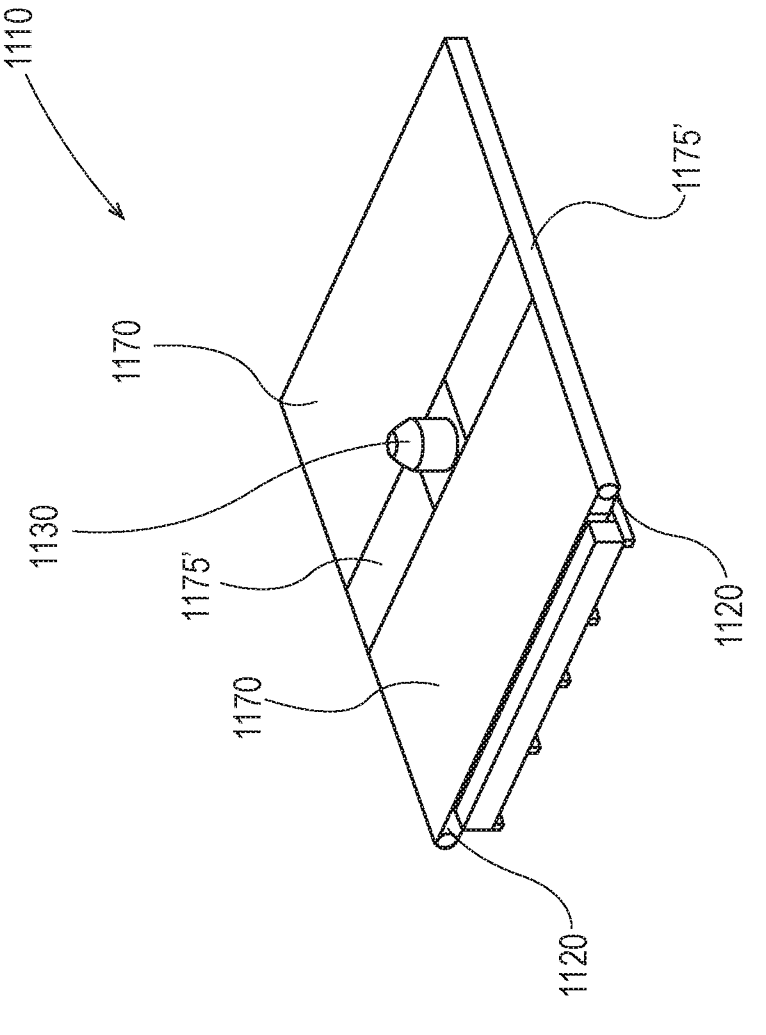
FIG. 3 is a perspective view of the platform of FIG. 2 where the core plug disposed therein protrudes from the surface of the platform and can engage the core of a parent roll.

Alternative, as shown in FIG. 3, the region disposed between adjacent conveyor belts forming the at least one conveyor belt 1170 can be provided as a trough 1175'. This can eliminate the need for any additional mechanical needs required by the positioning of any secondary conveyor belts 1175 in the region disposed between adjacent conveyor belts forming the at least one conveyor belt 1170. This may be suitable if the parent roll 125 has sufficient roll integrity and physical characteristics that do not require complete support of the end of the parent roll 125 disposed upon platform 1110.

As shown in FIGS. 2-3, a first core plug 1130 can be disposed within platform 1110. In this manner, the first core plug 1130 can engage the corresponding end of core of a parent roll and the corresponding end of the parent roll can be placed into contacting and supporting engagement with platform 1110. Such contacting and supporting engagement can provide columnar stability to a parent roll when platform 1110 is disposed under the parent roll so that the core of the parent roll is disposed orthogonal to the surface of platform 1110. Upon the positioning of the respective end of the parent roll and core proximate to first core plug 1130, first core plug 1130 can then be extended orthogonal to, and relative to, the surface of platform 1110 as shown in FIG. 3 into the core of the parent roll as may be required. In any regard, one of skill in the art will readily recognize the benefits associated with the flexibility of the above-described arrangements possible for the first core plug 1130 for cooperative association and engagement with the core of a parent roll.

As would be readily recognized by one of skill in the art, the system shown can facilitate the transport of parent rolls to locations distal from the papermaking operation and/or the dry end of a paper machine. A parent roll provided in contacting engagement with platform 1110 and/or first core plug 1130 can be conveyed to a location for storage of the parent roll and then disengaged from any of first core plug 1130 and conveyed off platform 1110 by the at least one conveyor belt 1170. One of skill in the art will recognize the viability of such a unique core transport system.

Figure 4:
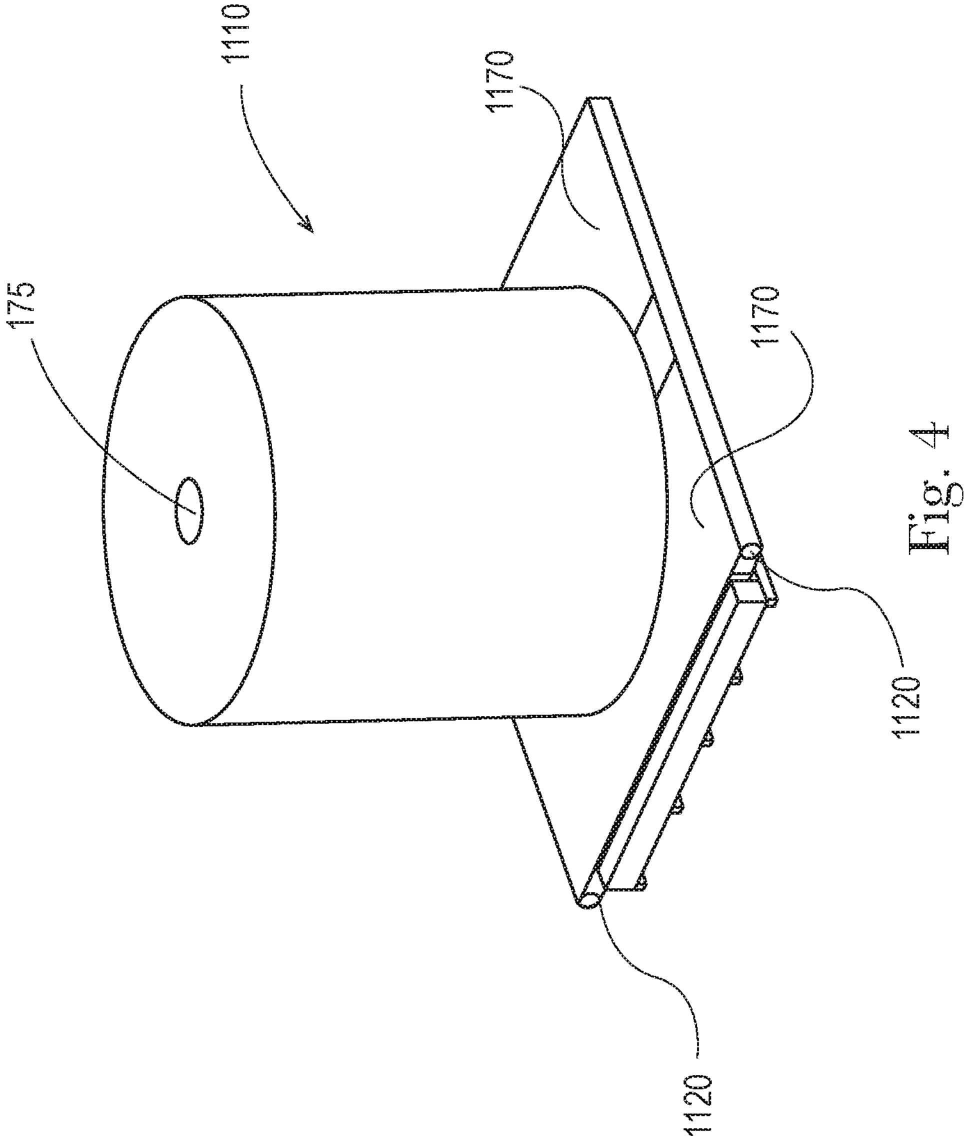
FIG. 4 is a perspective view of the platform of FIG. 2 having a parent roll disposed thereon.
Figure 5:
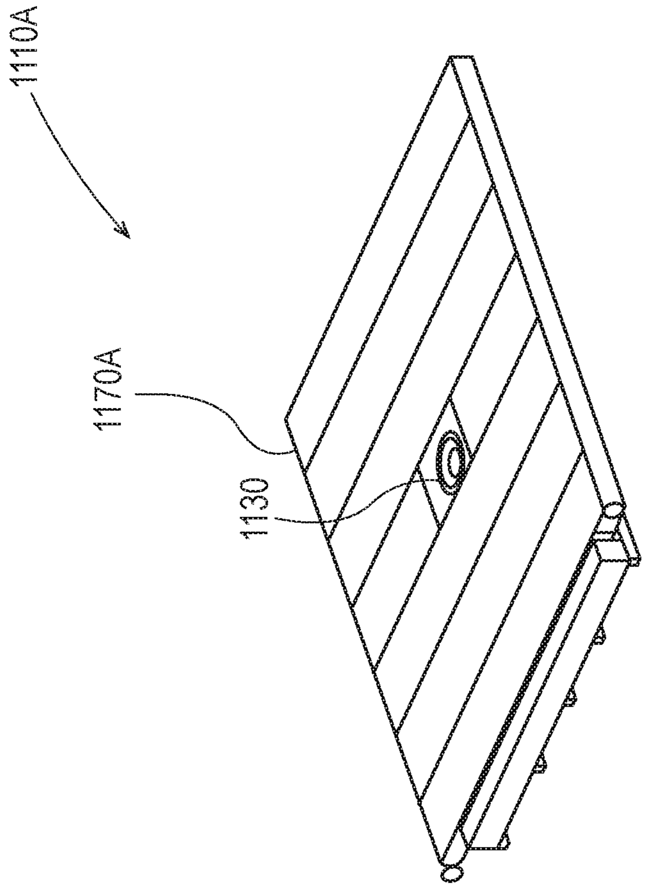
FIG. 5 is a perspective view of a platform capable of having a parent roll disposed thereupon and suitable for connection to an end effector where the platform is a pallet and has a core plug disposed therein.
Figure 6:
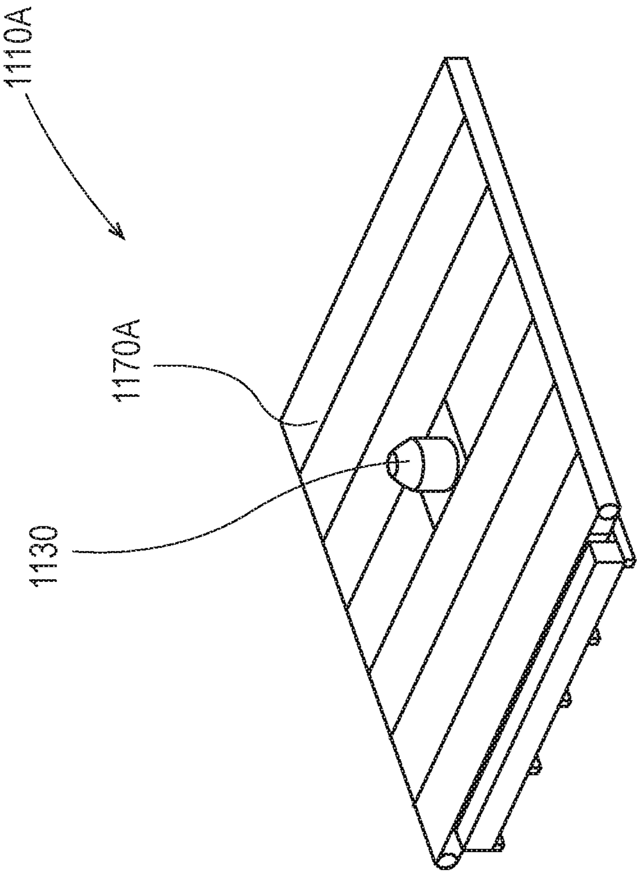
FIG. 6 is a perspective view of a the platform of FIG. 5 where the core plug disposed therein protrudes from the surface of the platform and can engage the core of a parent roll.

The parent roll transporter can be utilized to transport the cooperatively engaged parent roll to a storage area with the parent roll core oriented in either a horizontal or vertical orientation. Upon reaching the storage area, the parent roll while disposed upon platform 1110 can be disassociated from the first core plug 1130. Platform 1110 can then be operatively disconnected from either the end effector or the parent roll transporter to provide a storage means for the upright storage of the parent roll. This can result in a combined parent roll/platform 1110 assembly as shown in FIG. 4. The first core plug 1130 can be positioned within the surface of platform 1110 and either operably attached and permanently associated with platform 1110. Thus, the platform 1110 and the first core plug 1130 associated thereto would operably disconnect from the end effector. Alternatively, the first core plug 1130 can be operably attached and temporarily associated thereto. Thus, the first core plug 1130 and the end effector could operably disconnect from platform 1110 while the first core plug 1130 would be removed from cooperative engagement with platform 1110 and remain in operative and connecting engagement with the end effector.

Alternatively, if a parent roll is to be picked up directly from the dry end of a paper machine and taken directly to a parent roll storage facility, the parent roll transporter can be provided with a motivator operatively connected to an end effector having a platform 1110A in the form of a pallet 1170A as shown in FIG. 4. Here, the parent roll transporter can approach the dry-end of the paper machine directly. The parent roll is typically positioned so that the core of the parent roll is horizontally oriented so that the web material produced by the papermaking equipment is wound about the core is co-planar and parallel to the longitudinal axis of the parent roll and core.

By way of example, a parent roll transporter can approach a parent roll disposed in the reel-up section of the dry end of the papermaking equipment so that the end effector presents the first core plug 1130 to cooperatively and insertingly engage the horizontally oriented core of the wound parent roll. As shown, the first core plug 1130 is preferably provided with any length desired to effect the desired insertion engagement into the respective end of the core cooperatively associated thereto in order to provide the required support, lifting ability, and the like for the parent roll.

Figure 7:
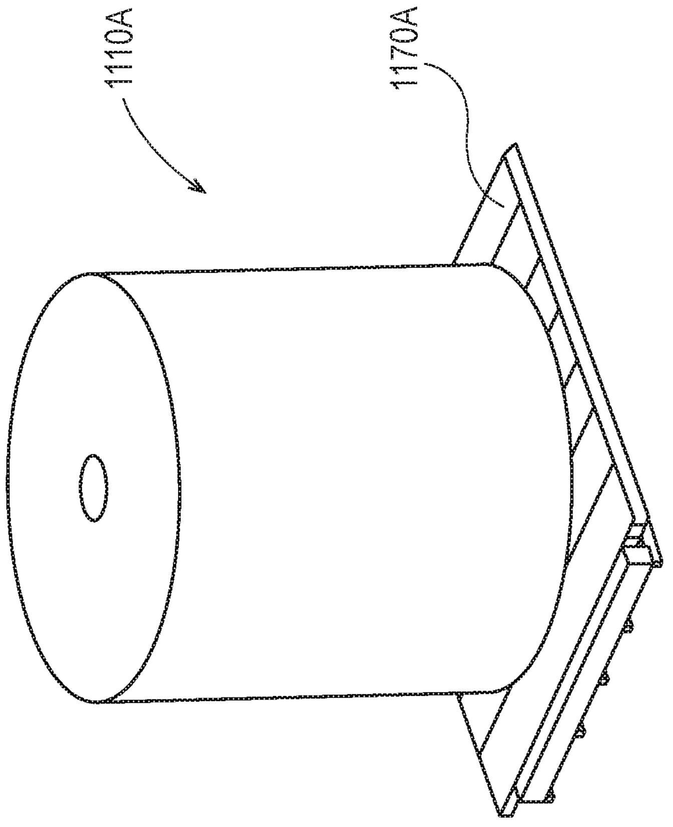
FIG. 7 is a perspective view of the platform of FIG. 5 having a parent roll disposed thereon.
Figure 8:
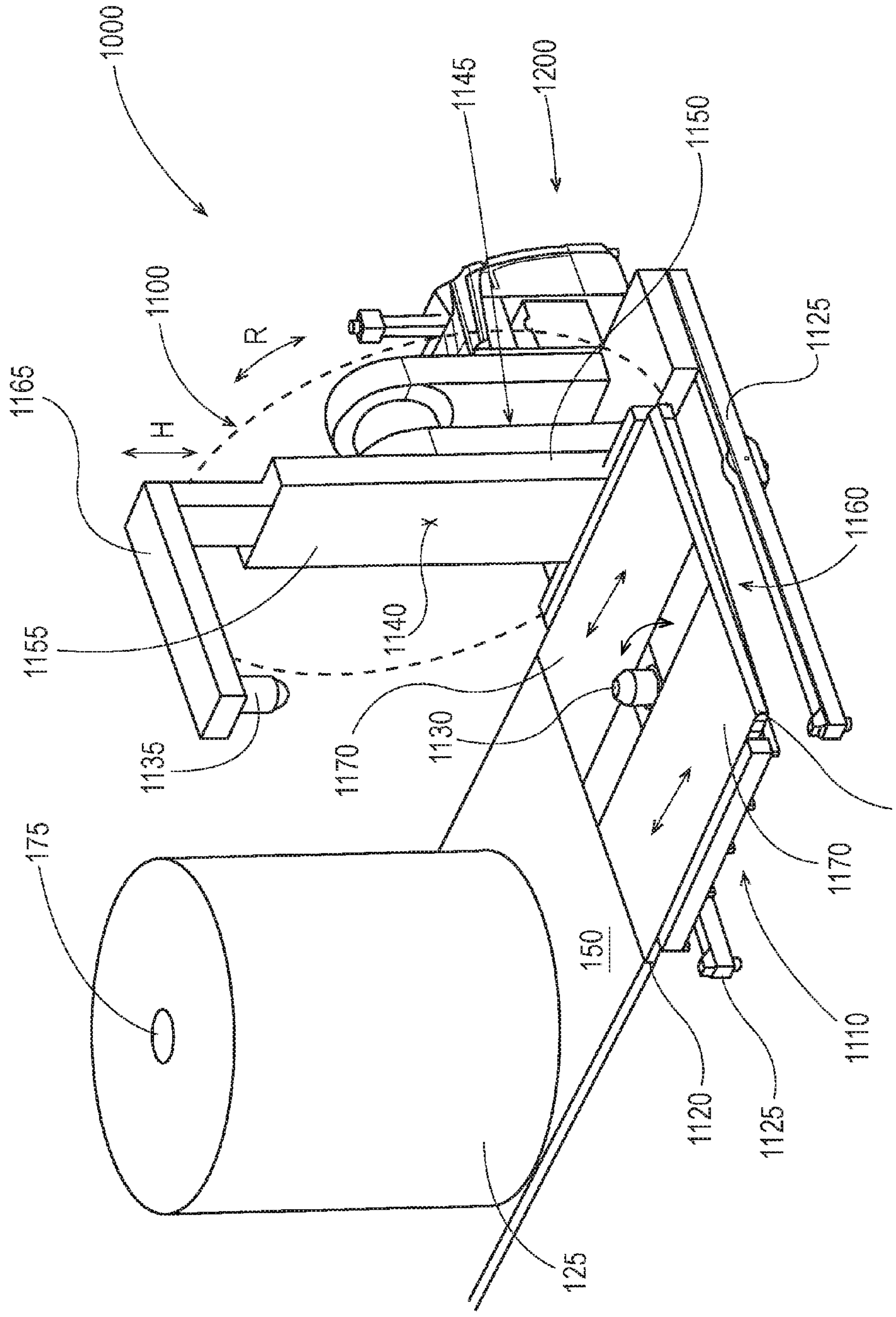
FIG. 8 is a perspective view of the exemplary platform of FIG. 1 engaged with the end effector and motivator providing a parent roll transporter and having an incoming parent roll of web material to be handled with the core plug disposed beneath the surface of the platform.

Parent roll transporter can then transport the cooperatively engaged parent roll to the storage area with the parent roll core oriented in either a horizontal or vertical orientation. Upon reaching the storage area, the parent roll while disposed upon platform 1110A can be disassociated from the first core plug 1130. Platform 1110A can then be operatively disconnected from either the end effector or the parent roll transporter to provide a storage means for the upright storage of the parent roll. This can result in a combined parent roll/platform 1110A assembly as shown in FIG. 7. The first core plug 1130 can be positioned within the surface of platform 1110A and either operably attached and permanently associated with platform 1110A. Thus, the platform 1110A and the first core plug 1130 associated thereto would operably disconnect from the end effector. Alternatively, the first core plug 1130 can be operably attached and temporarily associated thereto. Thus, the first core plug 1130 and the end effector could operably disconnect from platform 1110A while the first core plug 1130 would be removed from cooperative engagement with platform 1110A and remain in operative and connecting engagement with the end effector.

As shown in FIGS. 8-12, a parent roll 125 disposed upon parent roll conveyor 150 can be continuously conveyed from a first position external to parent roll transporter 1000 and end effector 1100 and into contacting engagement with the at least one conveyor belt 1170 of platform 1110. Further platform 1110 can be provided with the ability to translate rotationally, r, about an axis formed by first core plug 1130 and second core plug 1135 in order to present the parent roll 125 at any orientation relative to parent roll transporter 1000. This can be beneficial by, for example, facilitating the ability of an end-user of the parent roll transporter 1000 to place the parent roll 125 disposed upon platform 1110 at any location relative to parent roll transporter 1000 desired without the need to move and/or reposition parent roll transporter 1000.

Platform 1110 can be operatively and cooperatively connected to an end effector 1100 and/or parent roll transporter 1000. The end effector 1100 generally comprises a frame 1145 comprising opposed first and second collinear radial members 1150 and 1155 and parallel longitudinal members 1160 and 1165 secured together orthogonally thereto. In a preferred embodiment, first and second radial members 1150 and 1155 and longitudinal member 1160 can be secured together as by welding. In another preferred embodiment, longitudinal member 1165 can be extensibly connected to second radial member 1155 so that longitudinal member 1165 is provided with an adjustable displacement, H, relative to longitudinal axis 1140 (also referred to herein as axis of rotation 1140).

End effector 1100 is generally provided with the ability to rotate about axis of rotation 1140 in a radial direction, R, relative to motivator 1200. Having end effector 1100 rotate about axis of rotation 1140 can provide with the ability to orient radial members 1150 and 1155 and longitudinal members 1160 and 1165 into virtually any opposed relationship for the cooperative placement of radial members 1150 and 1155 and longitudinal members 1160 and 1165 relative to parent roll 125 and/or core 175. An end effector 1100 with the ability to rotate about axis of rotation 1140 can provide with the ability to orient parent roll 125 from a first position to any desired second orientation relative to the axis of rotation 1140. Further, providing the second radial member 1155 with an adjustable displacement, H, relative to longitudinal axis 1140 can facilitate the positioning of longitudinal member 1165 relative to parent roll 125 to accommodate a parent roll 125 having any longitudinal length. The desired adjustable displacement, H, can be provided by any means understood by one of skill in the art for providing such adjustment. This can include linear actuators, pneumatic actuators, hydraulic actuators, mechanical actuators (such as chain drives, gear drives, rack-and-pinion drives), combinations thereof, and the like.

As shown in FIGS. 8-12, the distal ends of parallel longitudinal members 1160 and 1165 are provided with a first core plug 1130 and second core plug 1135 respectively. It is envisioned that first core plug 1130 and second core plug 1135 are separately engageable and/or mutually cooperatively engageable with a respective end of core 175 of parent roll 125 and displaceable within the respective end of core 175. First core plug 1130 can be fixably attached to the distal end of longitudinal member 1165 where such attachment of second core plug 1135 is being made rigid by welding to longitudinal member 1165, for example. Longitudinal member 1165 can be provided with any length desired for example as longitudinal member 1165A. The length of longitudinal member 1165 may be advantageously lengthened as provided by longitudinal member 1165A in order to provide control of the web material disposed about the core 175 of parent roll 125 if the web material may have a low coefficient of friction or some other attribute that may enhance the ability of one layer, or layers, of parent roll 125 to slidably translate relative to a succeeding layer, or layers, of parent roll 125. Further, second core plug 1135 can be provided with any length desired to effect the desired insertion engagement into the respective end of core 175 cooperatively associated thereto in order to provide the required support, lifting ability, and the like for the parent roll 125. For example, if parent roll 125 is heavy or is fairly long (i.e., parent roll 125 has a relatively long longitudinal axis, for example, a parent roll of paper used for the manufacture of tissue and towel products), then it may be appropriate to provide second core plug 1135 with a fairly long length as opposed to a parent roll 125 having a relatively light weight or short length (i.e., parent roll 125 has a relatively short longitudinal axis, for example, a parent roll of web material used for the manufacture of diaper products).

Alternatively, if space constraints require minimizing (or even restraining) the extension of radial member 1155 relative to longitudinal axis 1140, one of skill in the art may desire to provide second core plug 1135 in a manner that permits the extensible displacement of second core plug 1135 relative to the distal end of parallel longitudinal member 1165. In a first position, second core plug 1135 can be positioned to have a profile that is flush with the surface of parallel longitudinal member 1165 in order to present second core plug 1135 to the respective end of parent roll 125 and core 175. Upon the positioning of second core plug 1135 at the respective end of parent roll 125 and core 175, second core plug 1135 can then be extended relative to the distal end of parallel longitudinal member 1165 into core 175 as may be required. In any regard, one of skill in the art will readily recognize the benefits associated with the flexibility of the above-described arrangements possible for the second core plug for cooperative association and engagement with the core 175 of parent roll 125.

Figure 9:
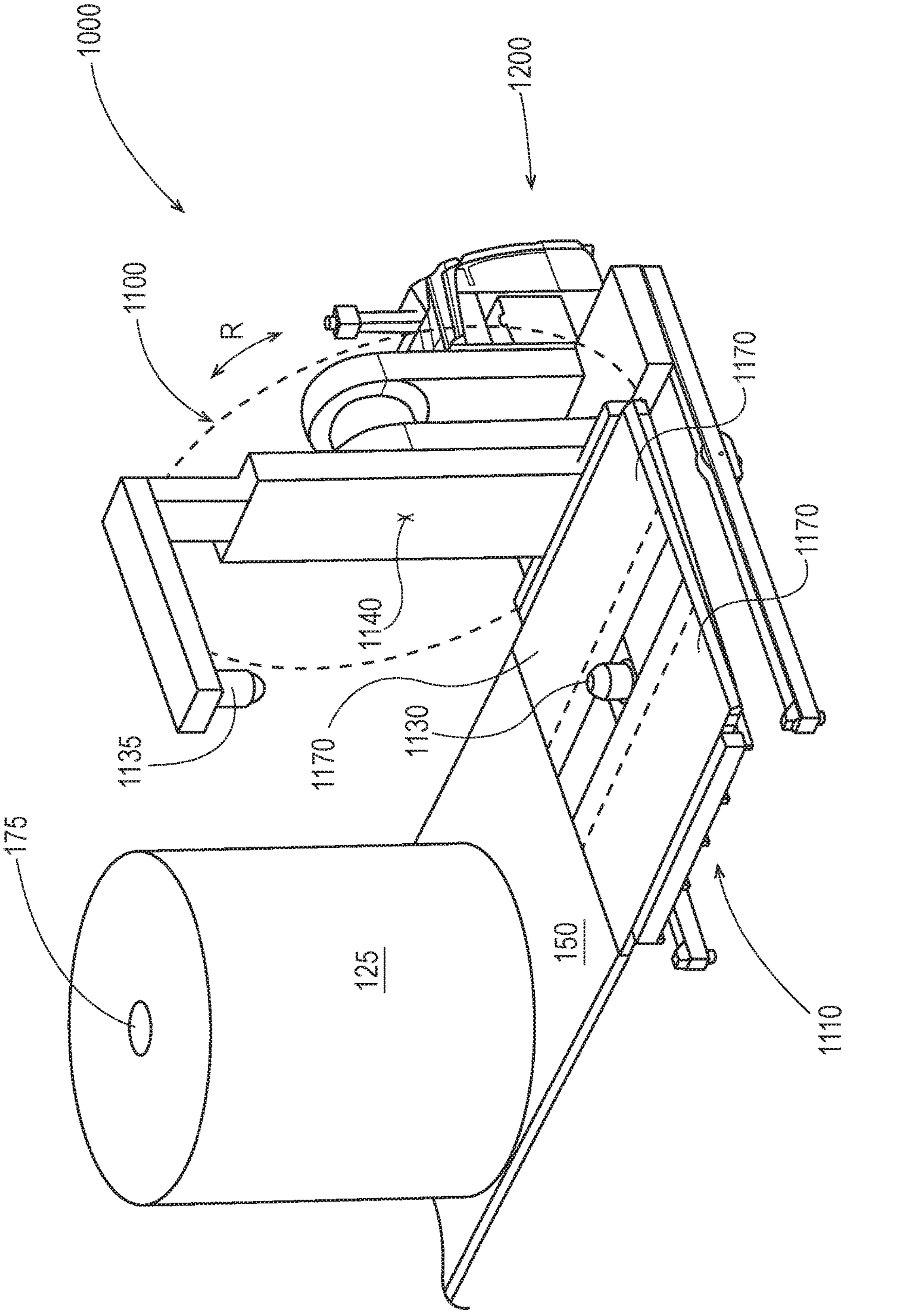
FIG. 9 is a perspective view of the exemplary platform of FIG. 1 engaged with the end effector and motivator providing a parent roll transporter and having an incoming parent roll of web material to be handled with the core plug extending above the surface of the platform.
Figure 10:
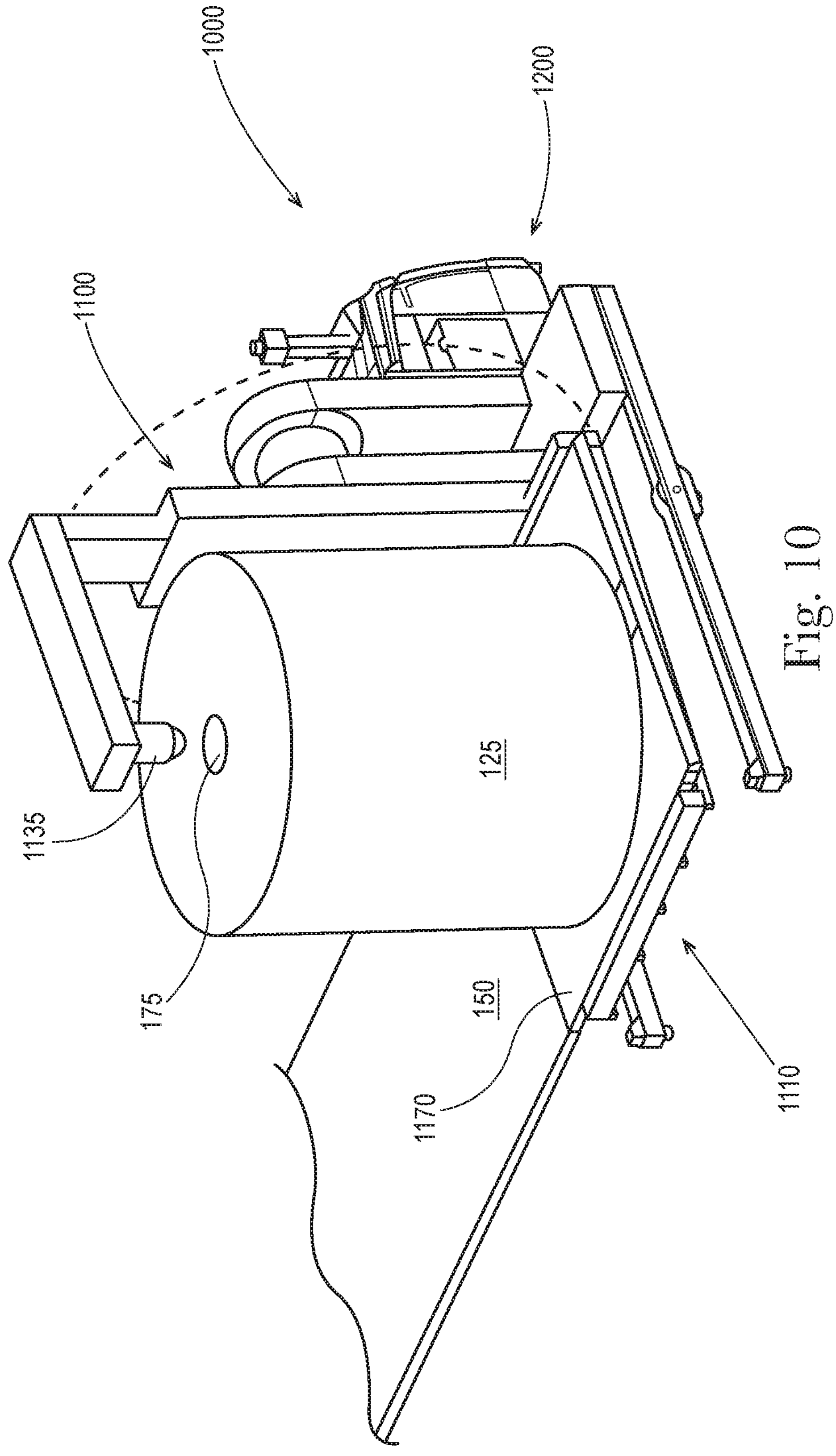
FIG. 10 is a perspective view of the exemplary platform of FIG. 1 engaged with the end effector and motivator providing a parent roll transporter and having a parent roll of web material disposed upon the surface of the platform.
Figure 11:
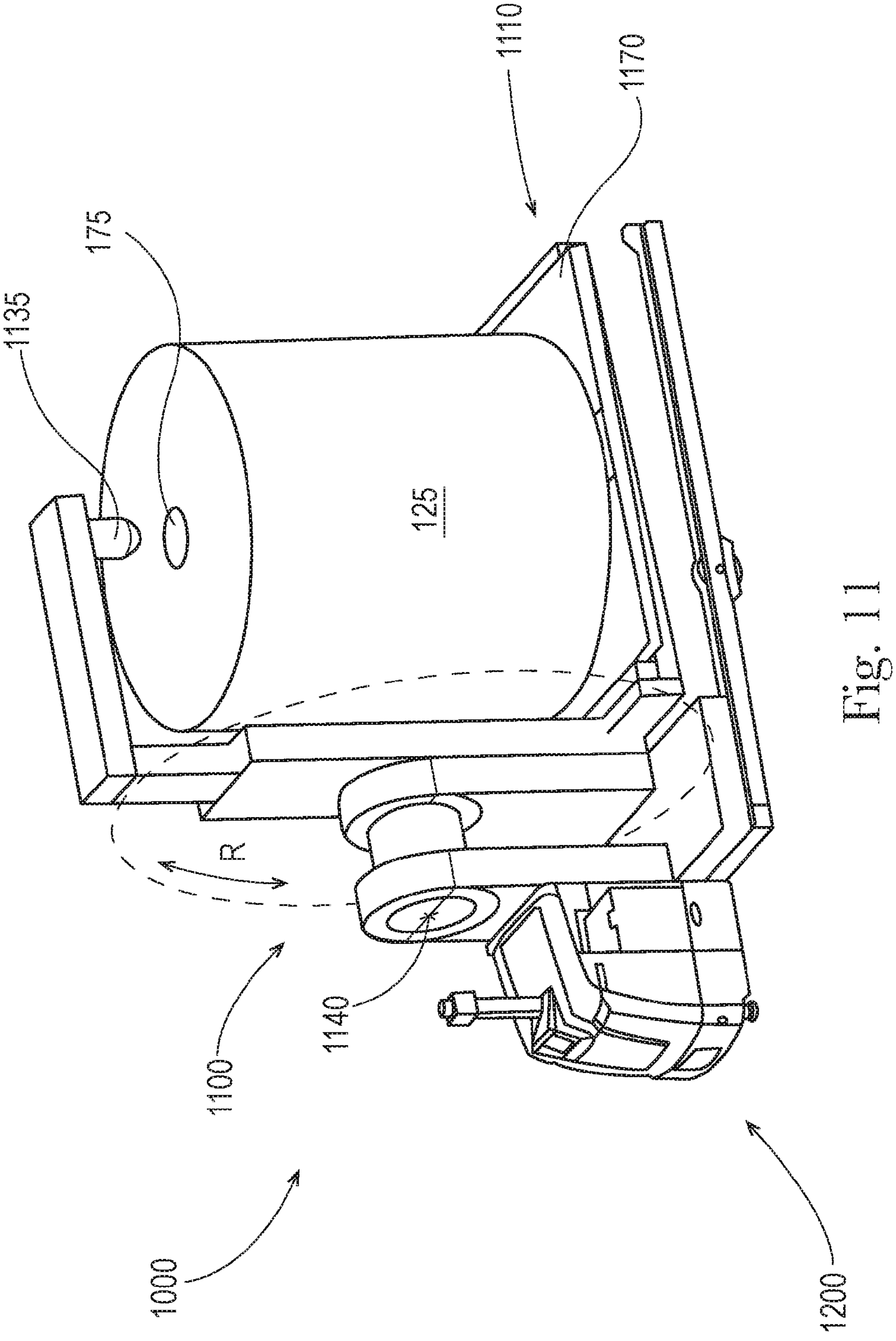
FIG. 11 is an alternative perspective view of the exemplary platform of FIG. 1 engaged with the end effector and motivator providing a parent roll transporter and having a parent roll of web material disposed upon the surface of the platform.

As shown in FIGS. 8-12, disposed across from second core plug 1135 and parallel longitudinal member 1165 is a first core plug 1130 disposed upon the distal end of parallel longitudinal member 1160. As presented in FIG. 8, first core plug 1130 can be disposed within platform 1110. In this manner, both the first core plug can engage the corresponding end of core 175 of parent roll 125 and the corresponding end of parent roll 125 can be placed into contacting and supporting engagement with platform 1110. Such contacting and supporting engagement can provide additional columnar stability to parent roll 125 when platform 1110 is disposed under parent roll 125 so that core 175 of parent roll 125 is disposed orthogonal to the surface of platform 1110. Upon the positioning of the respective end of parent roll 125 and core 175 proximate to first core plug 1130, first core plug 1130 can then be extended orthogonal to, and relative to, the distal end of parallel longitudinal member 1160 and the surface of platform 1110 as shown in FIG. 9 into core 175 as may be required. In any regard, one of skill in the art will readily recognize the benefits associated with the flexibility of the above-described arrangements possible for the first core plug 1130 for cooperative association and engagement with the core 175 of parent roll 125 represented in FIGS. 10-12.

Without desiring to be bound by theory, it is believed that an end effector 1100 having the spaced-apart core plugs (i.e., first core plug 1130 and second core plug 1135 discussed supra) helps maintain any caliper that may have been built into the product being produced for the parent roll because the spaced-apart core plugs of end effector 1100 do not actually contact the surface of the web material disposed about the core 175 of parent roll 125. This is quite the opposite of the prior art compressive-type parent roll clamps. In this manner, it is reasonably believed that a round parent roll handled by the end effector 1100 of the present disclosure will produce a finally wound consumer products having consistent desired physical characteristics. As discussed supra, it is believed that a compressive-type clamp used for the conventional pick-up of a parent roll of wound web material effectively removes any caliper that may have been built into the product being produced for the parent roll. This lost caliper cannot be recovered to any large degree due to the early stage of the life of the web material that is being so compressed. This lost and unrecoverable caliper can have a deleterious effect on the finally converted web material because the desired target values of the chosen parameters will be out of range even before the converting process has begun. Net—this clearly undesirable effect on the end product can be noticed by an end user of the product. Clearly, the parent roll transporter 1000 having the end effector 1100 of the present disclosure eliminates and clearly remedies this awful and detrimental side-effect.

Additionally, the end effector 1100 of the present disclosure, when operatively connected to a parent roll transporter 1000, can eliminate any eccentricity developed by the parent roll due to the handling caused by previous parent roll transport mechanisms. Eccentricity is a parameter associated with every conic section. It can be thought of as a measure of how much the conic section deviates from being circular. For example, a desirable parent roll that causes minimal disruptions during a converting operation will be perfectly cylindrical and have a circular cross-section where the eccentricity is zero (or nearly zero). Previous roll transport devices using end effectors that effectively compressed the parent roll introduce a degree of eccentricity to the cross-section of the parent roll—i.e., the eccentricity is greater than zero. For purposes of this disclosure, a parent roll having any cross-sectional shape other than a circle has an eccentricity of greater than zero. Thus, a parent roll having, for example, a cross-sectional shape resembling a flat tire, a figure-eight, a polygon, or any other non-circular cross section, has an eccentricity of greater than zero. In certain cases, the eccentricity can be significantly greater than zero.

Figure 1A:
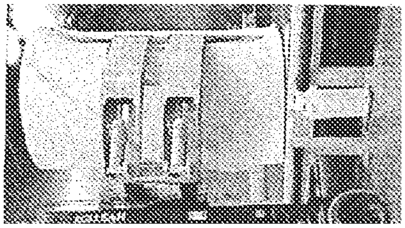
Fig. 1A (PRIOR ART)
FIG. 1A is a photograph of an exemplary prior art paper roll clamp having a pair of pivoted clamp arms mounted on a lift truck mast prior to contacting engagement with a parent roll of a typical web material used for the production of consumer products such as bath tissue, facial tissue, and/or paper toweling.
Figure 1B:
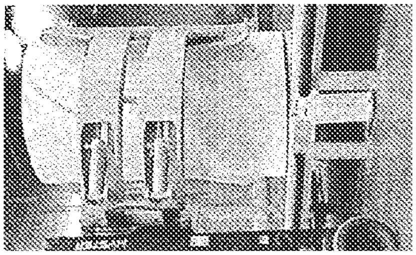
Fig. 1B (PRIOR ART)
FIG. 1B is a photograph of an exemplary prior art paper roll clamp having a pair of pivoted clamp arms mounted on a lift truck mast in contacting engagement with a parent roll of a typical web material used for the production of consumer products such as bath tissue, facial tissue, and/or paper toweling, the photograph showing significant deformation observed in the parent roll due to the compressing engagement of the paper roll clamp with the parent roll.

Thus, another goal of the present disclosure is to provide a process that can provide for an increase in the convertibility of a convolutely wound parent roll by reducing the eccentricity in the parent roll caused by end effectors (such as the exemplary prior art paper roll handling clamp shown in FIGS. 1-2). In other words the parent roll is produced by a papermaking process and has a first eccentricity (preferably about zero) and is transported to a converting process by a parent roll transporter 1000 having the end-effector 1100 described herein that effectively maintains its eccentricity. Alternatively, the process can also be expressed as method to improve the convertibility of parent rolls by using a parent roll transport process that transports a parent roll, using the end-effector 1100 described herein, having a first eccentricity from a papermaking process to a converting process at a second eccentricity, where the first and second eccentricities are about the same value. Still further, the process relationship can be expressed in terms of a comparison of the eccentricity of a parent roll that has been transported by a previous parent roll transport mechanisms and by a parent roll conveyor 150 operably connected to an end-effector 1100 described herein where the previous parent roll transport mechanisms provides the parent roll 125 to a converting operation at a first eccentricity and the presently described parent roll conveyor 150 using the end-effector 1100 described herein provides the parent roll 125 to a converting operation at a second eccentricity where the second eccentricity is less than the first eccentricity.

As parent roll 125 assumes contacting engagement with the at least one conveyor belt 1170 upon exiting contacting engagement with parent roll conveyor 150, the at least one conveyor belt 1170 can transport and position the parent roll 125 into a region proximate to the centroid of platform 1110 so that the core 175 is disposed coaxially relative to first core plug 1130. This positioning will then facilitate the insertion of first core plug 1130 into the corresponding end of core 175 as required.

Figure 12:
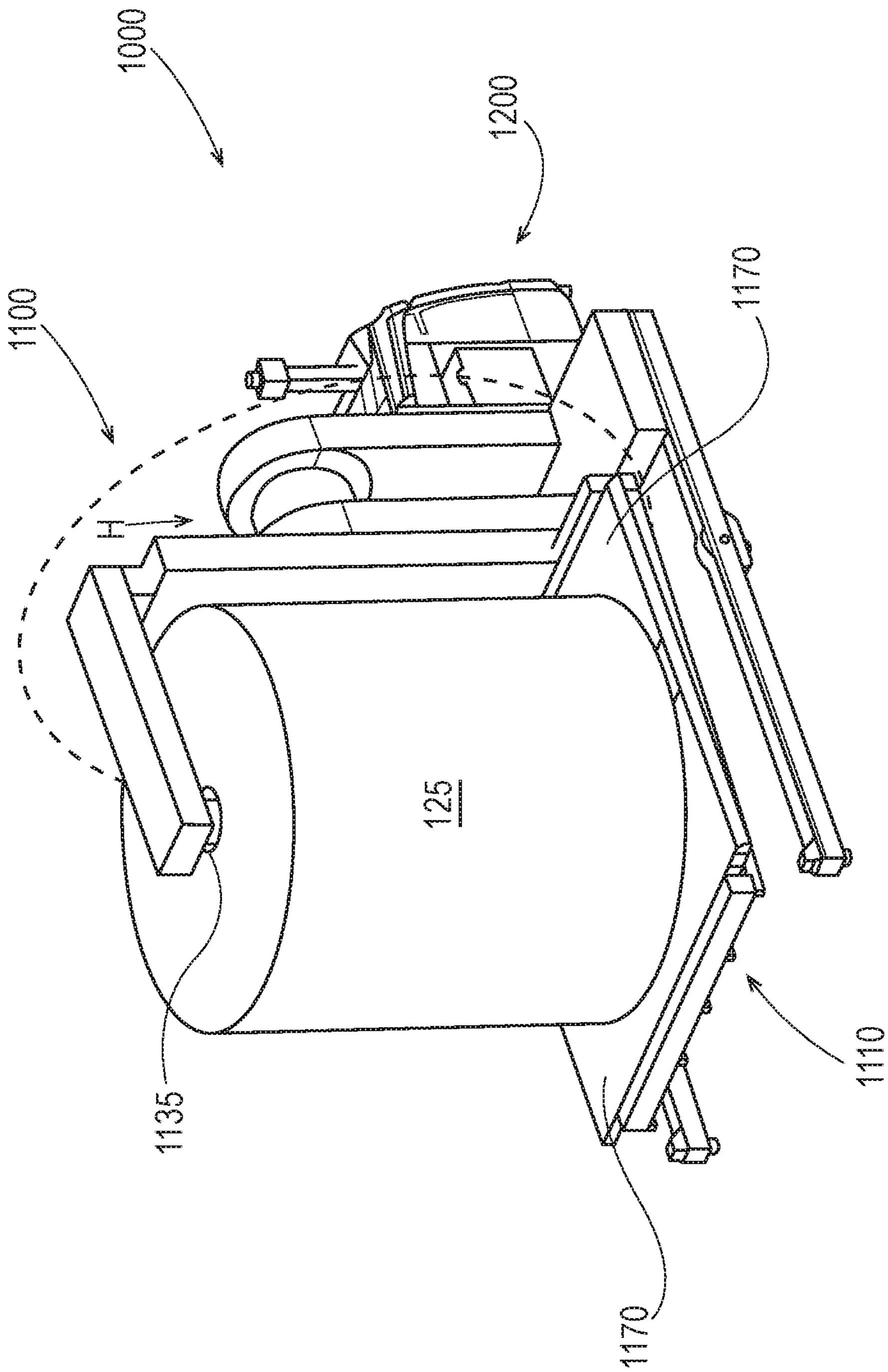
FIG. 12 is a perspective view of the exemplary platform of FIG. 1 engaged with the end effector and motivator providing a parent roll transporter and having a parent roll of web material disposed upon the surface of the platform and a core plug disposed within the core of the parent roll.
Figure 13:
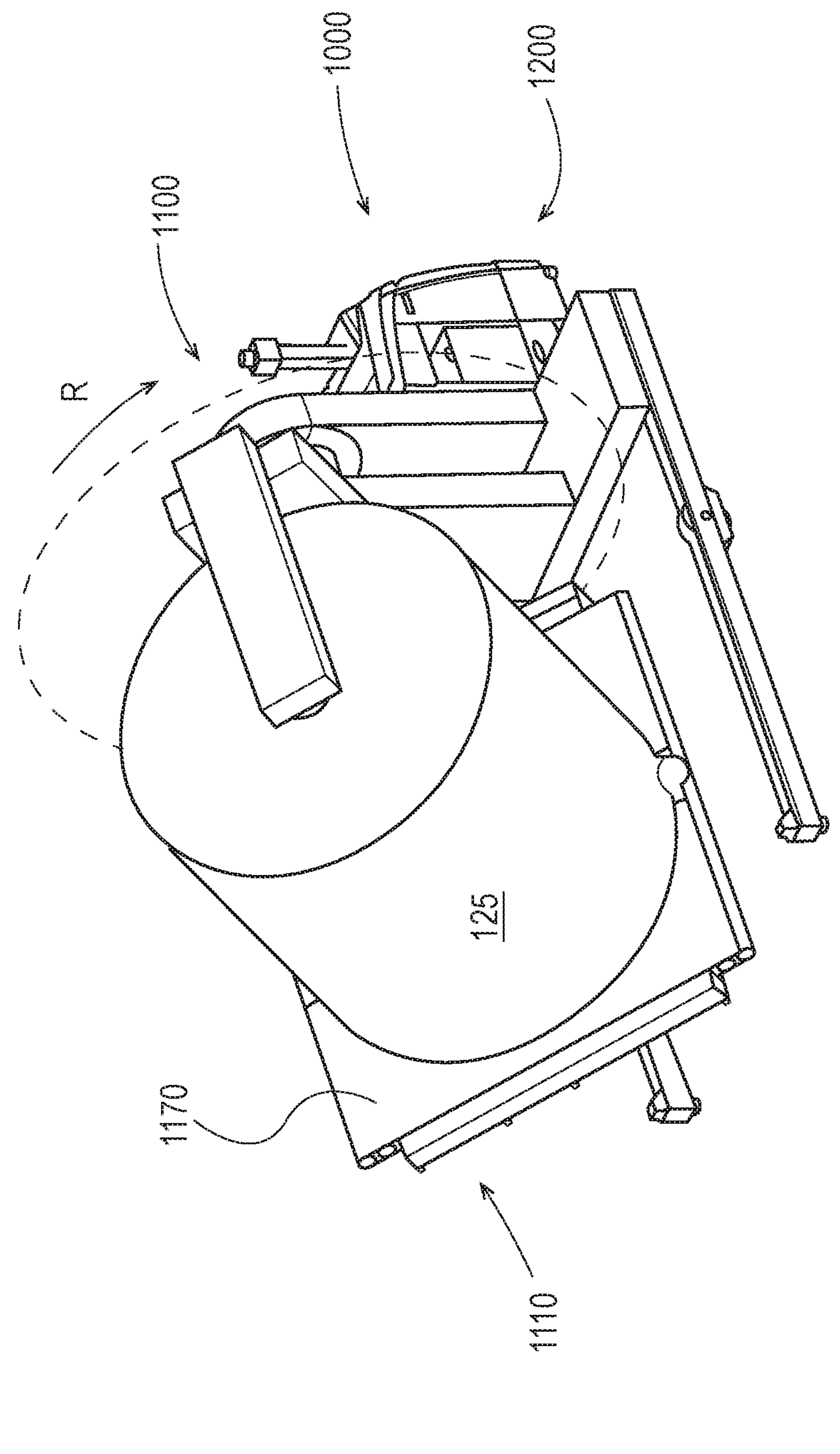
FIG. 13 is a perspective view of the exemplary parent roll transporter of FIG. 12 depicting the end effector and motivator re-orienting a parent roll disposed upon the surface of the platform.
Figure 14:
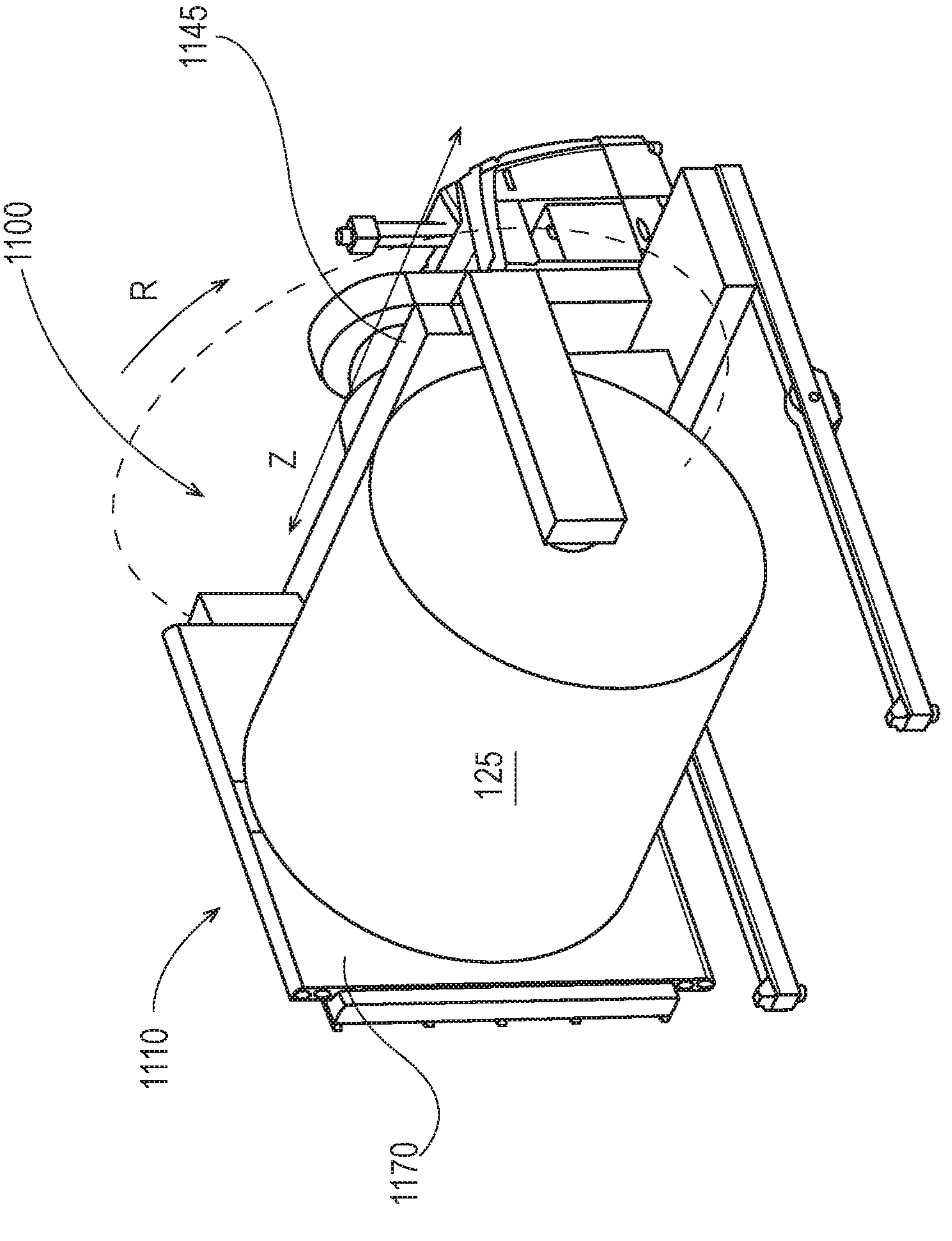
FIG. 14 is a perspective view of the exemplary parent roll transporter of FIG. 1 depicting the end effector and motivator with a re-oriented parent roll disposed upon the surface of the platform.

Alternatively, it may be advantageous to transport a parent roll 125 from the dry end of a papermaking process directly to a parent roll converting operation as discussed supra. To satisfy this need, one of skill in the art will recognize that parent roll transporter 1000 can provide the end effector 1100 cooperatively attached thereto can effectively rotate, R, parent roll 125 about the axis of rotation 1140. As shown in FIGS. 13-14, the longitudinal axis of parent roll 125 can be changed from a substantially vertical orientation as shown in FIG. 12 through the axis of rotation 1140 into a substantially horizontal orientation as shown in FIGS. 13-14.

Also as shown in FIG. 14, the parent roll transporter can then position the end effector 1100 laterally, z, relative to motivator 1200 as required. Any lateral, z, movement can be used assist in aligning the parent roll 125 with the converting equipment. For example, a degree of lateral movement, z, may be required in order to align and dispose the parent roll 125 upon an unwind stand used by the converting equipment unwind. It is believed that the control of such lateral movement, z, can be provided by the motivator or by any device understood by one of skill in the art for providing such adjustment. This can include linear actuators, pneumatic actuators, hydraulic actuators, mechanical actuators (such as chain drives, gear drives, rack-and-pinion drives), combinations thereof, and the like.

Thus, in practice, a parent roll 125 disposed upon parent roll conveyor 150 can be continuously conveyed from a first position external to parent roll transporter 1000 and end effector 1100 and into contacting engagement with the at least one conveyor belt 1170 of platform 1110. As parent roll 125 assumes contacting engagement with the at least one conveyor belt 1170 upon exiting contacting engagement with parent roll conveyor 150, the at least one conveyor belt 1170 can transport and position the parent roll 125 into a region proximate to the centroid of platform 1110 so that the core 175 is disposed coaxially relative to first core plug 1130. This positioning will then facilitate the insertion of first core plug 1130 and second core plug 1135 into the corresponding end of core 175 as required. The parent roll transporter can then rotate, R, end effector 1100 about the axis of rotation 1140 as required. The rotated parent roll 125 can then be disposed as required by the converting process. As the parent roll is positioned for the converting process desired, first core plug 1130 and second core plug 1135 can then be retracted (e.g., withdrawn) from inserted engagement within core 175 thereby removing contacting engagement of parent roll 125 from end effector 1100. The disengaged roll can then be processed as required.

Alternatively, the parent roll transporter 1000 can be destined to transport the cooperatively engaged parent roll 125 to a storage area with the parent roll core 175 disposed thereon. Upon reaching the storage area, the parent roll 125 while disposed upon platform 1110 can be disassociated from the first and second core plugs. Platform 1110 can then be operatively disconnected from either end effector 1100 or parent roll transporter 1000 to provide a storage means for the upright storage of parent roll 125. This can result in a combined parent roll 125/platform 1110 assembly as shown in FIG. 4. A first core plug can be positioned within the surface of platform 1110 and either operably attached and permanently associated with platform 1110. Thus, the platform 1110 and the first core plug associated thereto would operably disconnect from end effector 1100. Alternatively, a first core plug can be operably attached and temporarily associated thereto. Thus, the platform 1110 would operably disconnect from platform 1110 while the first core plug would be removed from cooperative engagement with platform 1110 and remain in operative and connecting engagement with end effector 1100.

Figure 15:
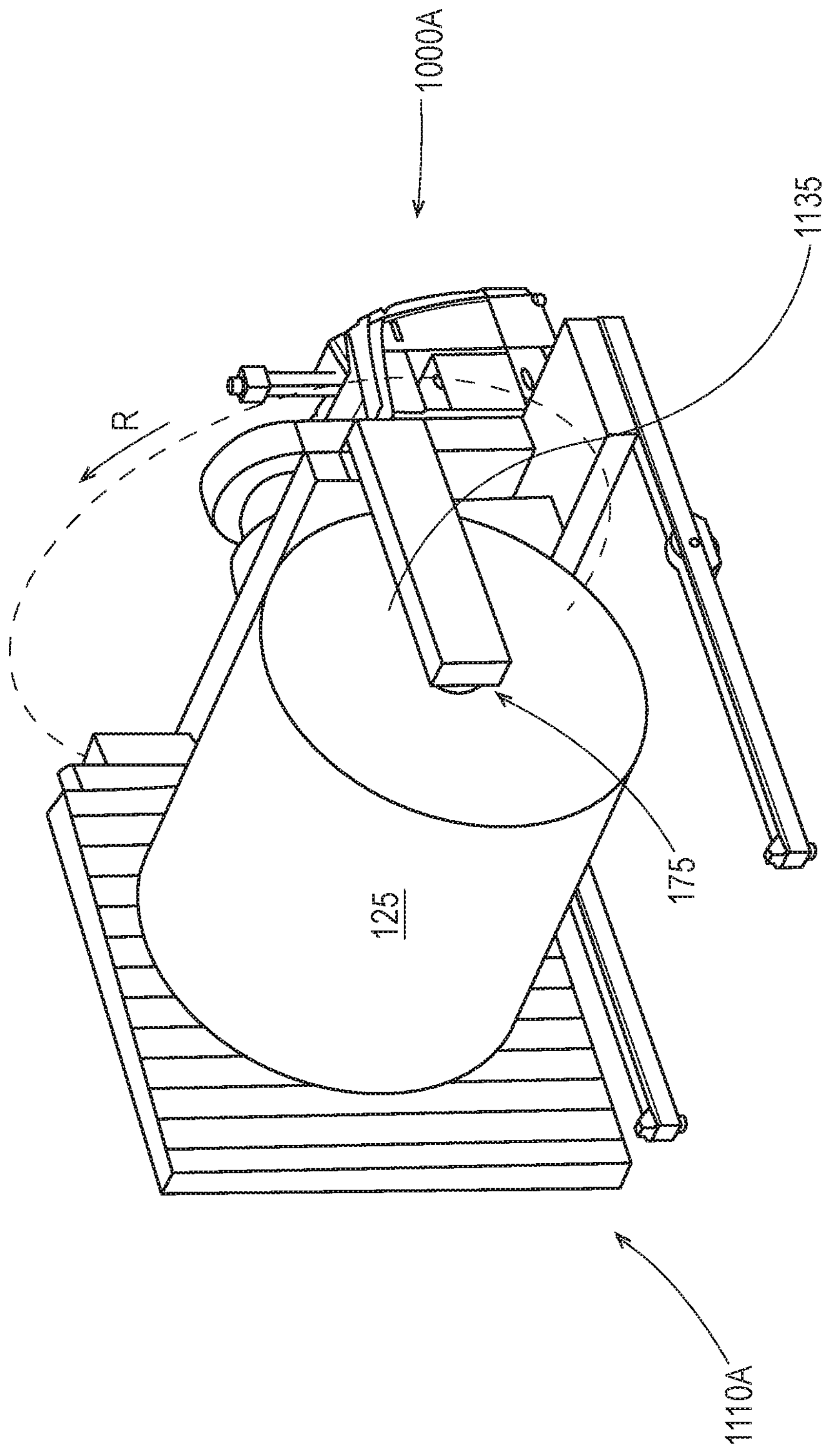
FIG. 15 is a perspective view of another exemplary parent roll transporter showing a parent roll disposed upon the platform of the end effector where the platform is in the form of a pallet and where the first and second core plugs are in complete engagement with the core; and, FIG. 16 is a perspective view of another exemplary parent roll transporter of FIG. 15 showing a parent roll disposed upon the platform of the end effector where the platform is in the form of a pallet and where the first and second core plugs are in complete engagement with the core and the end effector has rotated the parent roll about the rotational axis of the end effector and changed the orientation of the longitudinal axis of the core of a parent roll.
Figure 16:
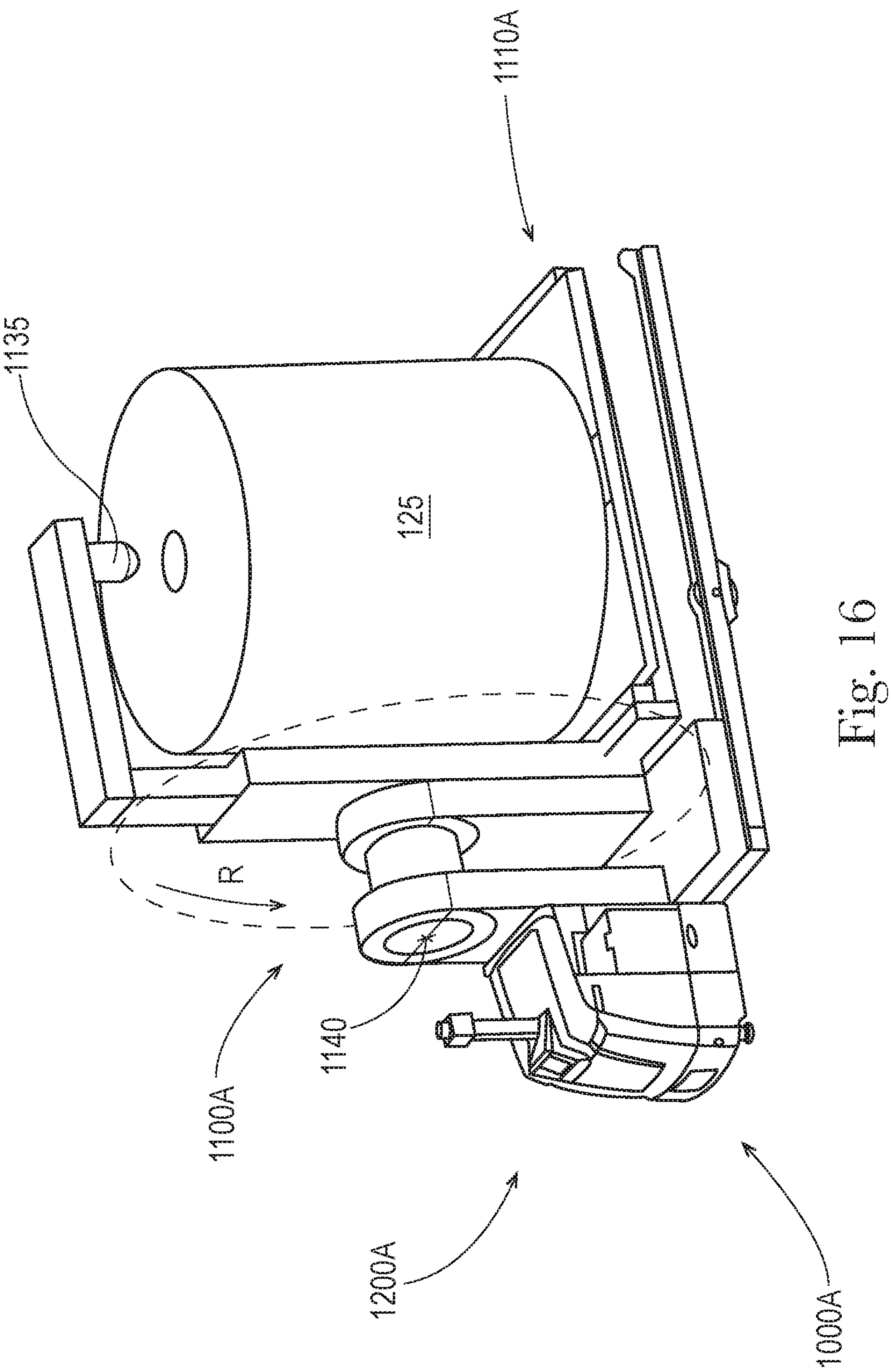

Alternatively, if the parent roll 125 is to be picked up directly from the dry end of a paper machine and taken directly to a parent roll 125 storage facility, the parent roll transporter 1000A can be provided with a motivator 1200 operatively connected to end effector 1100A having platform 1110A in the form of a pallet as shown in FIGS. 15-16. Here, the parent roll transporter 1000A can approach the dry-end of the paper machine directly. The parent roll 125 is typically positioned so that the core 175 of the parent roll 125 is horizontally oriented so that the web material produced by the papermaking equipment is wound about the core 175 is co-planar and parallel to the longitudinal axis of the parent roll 125 and core 175.

Parent roll transporter 1000A can approach parent roll 125 disposed in the reel-up section of the dry end of the papermaking equipment so that the end effector 1100A presents the first core plug (not shown) and second core plug 1135 to cooperatively and insertingly engage the horizontally oriented core 175 of the wound parent roll 125. As shown, first core plug (not shown) is preferably fixably attached to the distal end of a longitudinal member (not shown) and second core plug 1135 is rigidly affixed to longitudinal member 1165. The first and second core plugs are preferably provided with any length desired to effect the desired insertion engagement into the respective end of core 175 cooperatively associated thereto in order to provide the required support, lifting ability, and the like for the parent roll 125.

Parent roll transporter 1000A can then transport the cooperatively engaged parent roll 125 to the storage area with the parent roll core 175 oriented in either a horizontal or vertical orientation. Upon reaching the storage area, the parent roll 125 while disposed upon platform 1110A can be disassociated from the first and second core plugs. Platform 1110A can then be operatively disconnected from either end effector 1100A or parent roll transporter 1000 to provide a storage means for the upright storage of parent roll 125. This can result in a combined parent roll 125/platform 1110A assembly as shown in FIG. 13. A first core plug can be positioned within the surface of platform 1110A and either operably attached and permanently associated with platform 1110A. Thus, the platform 1110A and the first core plug associated thereto would operably disconnect from end effector 1100. Alternatively, a first core plug can be operably attached and temporarily associated thereto. Thus, the platform 1110A would operably disconnect from platform 1110A while the first core plug would be removed from cooperative engagement with platform 1110A and remain in operative and connecting engagement with end effector 1100A.

One of skill in the art will recognize that the parent roll transporter 1000 of the present disclosure, as discussed supra, can be operatively connected or associated with a motivator 1200. One of skill in the art will appreciate that motivator 1200 could be provided as an automatic guided vehicle (AGV), as a more traditional forklift, or with some other form of robotic systems. In any regard, the motivator 1200 is used to move the end effector 1100, with or without a parent roll 125 cooperatively engaged thereto, between various points along a desired route in a manufacturing process.

The parent roll transporter 1000 of the present disclosure is especially suitable with a motivator 1200 provided as an AGV. A plurality of AGVs can function as a system having a number of battery powered, wheeled, operatorless vehicles (i.e., AGV) which are automatically guided along the floor in a warehouse or other commercial or industrial site, where guide path wires are embedded in the floor, and under the control of on-board computers. Each AGV can be provided with accurate and reliable guidance and routing where a controller may be operated either on-board or remotely from the vehicle.

It is the purpose of the motivator 1200 to move material between various points along a route on vehicles which can be programmed to follow a preset choice of routes and to carry out various operations along the route, such as stops and turns. Most systems which have been proposed use induction guidance where the guide path is defined by a wire embedded in the floor. An AC current, fed through the wire, generates an electromagnetic field which is detected by coils on the vehicle which track the wire. Two coils are used in most cases which provide a differential current when the vehicle deviates from the wire which is used to control the steering of the vehicle so as to return it to its proper track. The guide path is usually in the form of a loop. By using two or more different frequencies of the AC current for different legs of the route, complex routes can be built up. Route selection is, in some systems, controlled by a computer on board each vehicle which programs the vehicle to follow a preset route. Typically, permanent magnets or electromagnetic loops and floor controllers installed in the floor divide the route into sections. In a typical installation, the program control computer instructs the vehicle to count its way along the route and to respond to different frequencies so as to follow different legs of the route.

An exemplary AGV suitable for use as a motivator 1200 can travel along a track formed on a floor by a white line or aluminum foil while detecting the track by means of an optical track sensor. In this type of conventional vehicle having, for example, three wheels, one front wheel and a pair of rear wheels, the front wheel can be driven through a connection to a driving system and can be automatically steered by a steering system while the rear wheels are freely rotatable but incapable of being driven by any driving system being steered.

Another exemplary AGV suitable for use as a motivator 1200 is a four-wheel vehicle having front and rear wheels and on the opposite sides of a center axis having left and right wheels each of which is provided with a driving motor. In this example, all wheels are set in the forward direction and the left and right wheels are driven by the driving motors so as to perform the ordinary travelling operation of the vehicle. The vehicle moves straight by equalizing the speeds of rotation of the left and right wheels and turns left or right by changing the speed ratio therebetween. At least the direction of the front wheels among the front and rear wheels can be freely changed so as to follow the motion caused when the left and right wheels are steered by changing the speed ratio therebetween. If the front and rear wheels are rotated in the reverse directions at the same rotational speed while the front and rear wheels are being fixed such as to be perpendicular to the direction of the front and rear of the vehicle body, the body of the vehicle can be turned about the point of intersection of the lines which connect the front wheel to the rear wheel and the left wheel to the right wheel.

Alternatively, the parent roll transporter 1000 of the present disclosure is also suitable with a motivator 1200 provided as a forklift truck. An exemplary forklift truck could comprise a forklift truck known in the art for the moving of large and/or heavy objects such as articles commonly found in warehouses, manufacturing facilities, and/or the like.

An exemplary forklift would comprise an undercarriage with an operator cabin including an operator seat unit pivotally supported therein. A load lifting unit including a lifting frame and a lifting fork is mounted to the front end of the undercarriage. Two front wheels and two steerable rear wheels and further a rear box structure with a lid can also be mounted to the under carriage. The forklift truck can be operated by an electric motor, natural gas, propane, gasoline, diesel fuel, and the like. The forklift can be energized by a battery, which can be disposed in a box structure that also serves as a counterweight for loads lifted by the load lifting unit.

In any regard, the motivator 1200 is operatively and cooperatively engaged with end effector 1100 to form parent roll transporter 1000. Such cooperative and operative engagement can be provided by a mechanical, electrical, and/or hydraulic latching mechanisms. It may be preferred to use pneumatic connections since pneumatic systems due to the ease of installation, maintenance, low cost, and light weight. Hydraulic systems may be preferred if the parent roll transporter 1000 will necessarily be used to lift and/or move large and/or heavy parent rolls 125. Electric systems can prove for more quiet connections.

Suitable means for attaching end effector 1100 to motivator 1200 can be provided by a mounting plate attached at a position suitable for cooperative engagement between end effector 1100 and motivator 1200. The mounting plate can contain threaded or clearance holes arranged in a pattern for suitable attachment with a coupling device. An adapter plate can be used for interconnection with a common lock-in position for pick-up by the motivator 1200. The coupling device may also contain the power source for the end effector 1100 and may automatically connect the power when the motivator 1200 picks up and connects to the end effector 1100. Alternatively, the end effector 1100 may have a power connection permanently connected thereto and the motivator 1200 simply picks up the end effect 1100 by connecting to an appropriate adapter plate with common lock-in points.

As would be recognized by one of skill in the art, any of the parent roll transporter 1000, motivator 1200, end effector 1100, and/or parent roll 125 can be provided with an RFID device, such as a tag, in order to assist with the transport, storage, connection, placement, location, etc. of any of parent roll 125 or platform 1110 or motivator 1200, or end effector 1100 or parent roll transporter 1000 relative to any of the initial pick-up of the parent roll 125 or storage or transport of parent roll 125 relative to the papermaking, storage, and/or parent roll converting processes.

Such an RFID system can assist with and is known and understood by those skilled in the art, and a detailed explanation thereof is not necessary for purposes of describing the method and system according to the present invention. As discussed above, RFID or other smart tag technology is finding increasing uses in material handling and processing environments, particularly in warehouse or other storage facilities wherein articles are stored and moved in the process of converting raw materials to finished products. RFID tags containing any manner of information related to the articles may be attached directly to the articles (such as parent roll 125), or associated with pallets, racks, bins, or any type of article packaging.

EXAMPLES

A. An end effector for a transport device for the movement of parent rolls of convolutely wound web materials, said end effector comprising:
  - a frame;
  - a first radial member operably connected to said frame, said first radial member having a first longitudinal member operably connected thereto and extending therefrom;
  - a second radial member operably connected to said frame, said second radial member having a second longitudinal member operably connected thereto and extending therefrom said first radial member and said second radial member being rotatable about an axis of rotation;

a first core plug operably connected to said first longitudinal member, said first core plug being extensible from a first position to a second position relative to said first longitudinal member;

a second core plug operably connected to said second longitudinal member, said second core plug being extensible from a first position to a second position relative to said second longitudinal member, said first and second core plugs being capable of cooperative and penetrating engagement with a core of said parent roll when said first core plug is disposed proximate to a first portion of said core of said parent roll and said second core plug is disposed proximate to a second portion of said core of said parent roll disposed distal from said first portion of said core of said parent roll;

wherein when said first and second core plugs are cooperatively engagable with said first and second portions of said core of said parent roll respectively, said end effector being capable of changing an orientation of said core and said parent roll from a first position to a second position by rotating said parent roll about said axis of rotation.

B. The end effector of A further comprising a platform operably connected to and in complementary engagement with said second longitudinal member and said second core plug, said second core plug being extendable through said platform.

C. The end effector of any of A through B wherein said platform further comprises at least one conveyor, said conveyor orbiting about a periphery of said platform, said parent roll being conveyable from a position external to said platform to a position upon said platform in cooperative alignment with said first and second core plugs.

D. The end effector of any of A through C wherein said platform further comprises a pallet.

E. The end effector of any of A through D wherein said platform is disassociatively disengageable from said end effector.

F. The end effector of E wherein said second core plug remains in operable engagement with said platform and is disengageable from said second longitudinal member when said platform is disassociatively disengaged from said end effector.

G. The end effector of any of A through F wherein said platform is cooperatively engageable with said end effector.

H. The end effector of any of A through G wherein said end effector is operably, cooperatively, and pivotably engagable to a motivator, said operably, cooperatively, and pivotably engaged motivator and end effector providing an apparatus for the non-compression transportation of a convolutely wound web material parent roll.

I. The end effector of H wherein said motivator and said end effector operably, cooperatively, and pivotably engaged thereto moves said parent roll cooperatively engaged thereto from a first position proximate to a papermaking process to a second position proximate to a parent roll converting operation.

J. The end effector of I wherein said motivator moves said parent roll cooperatively engaged thereto from said a first position proximate to said papermaking process to said second position proximate to said parent roll converting operation via a programmed preset choice of routes.

K. The end effector of any of A through J wherein said end effector rotates radially about an axis of rotation relative to said motivator.

L. The end effector of any of A through K wherein said end effector is fixably engaged to said motivator.

M. The end effector of any of A through L wherein said first radial member is extensible relative to said axis of rotation, wherein said extensible first radial member provides said first longitudinal member with an adjustable displacement, H, relative to said longitudinal axis.

N. The end effector of M wherein said adjustable displacement, H, is provided by a device selected from the group consisting of linear actuators, pneumatic actuators, hydraulic actuators, mechanical actuators, chain drives, gear drives, rack-and-pinion drives, and combinations thereof.

O. The end effector of any of A through N wherein said first longitudinal member is provided with a length, said length being at least about equal to a diameter of said parent roll, said first longitudinal member preventing the slidable translation of a first layer of said parent roll relative to a succeeding layer of said parent roll.

P. The end effector of any of A through O wherein when said first and second core plugs are cooperatively engagable with said core when said core and said parent roll are disposed horizontally.

Q. The end effector of any of A through P wherein when said first and second core plugs are cooperatively engagable with said core when said core and said parent roll are disposed vertically.

R. The end effector of any of A through Q wherein said first and second core plugs are cooperatively engageable with a parent roll conveyor, said parent roll conveyor conveying said parent roll from a first position relative to a papermaking process to a second position relative to said papermaking process, said first position being disposed proximate to a papermaking process reel-up section and said first and second core plugs cooperatively engaging said core at said second position.

S. The end effector of any of A through R wherein said second core plug is provided with a profile, said profile providing said second core plug with a first position flush with a surface of said second longitudinal member and a second position wherein said second core plug is extended relative said surface of said second longitudinal member.

T. The end effector of any of A through S wherein said first core plug is fixably attached to a distal end of said first longitudinal member.

The dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as “40 mm” is intended to mean “about 40 mm”.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An end effector for a transport device for the movement of parent rolls of convolutely wound web materials, said end effector comprising:

a frame;

a first radial member operably connected to said frame, said first radial member having a first longitudinal member operably connected thereto and extending therefrom;

a second radial member operably connected to said frame, said second radial member having a second longitudinal member operably connected thereto and extending therefrom said first radial member and said second radial member being rotatable about an axis of rotation;

a first core plug operably connected to said first longitudinal member, said first core plug being extensible from a first position to a second position relative to said first longitudinal member;

a second core plug operably connected to said second longitudinal member, said second core plug being extensible from a first position to a second position relative to said second longitudinal member, said first and second core plugs being capable of cooperative and penetrating engagement with a core of said parent roll when said first core plug is disposed proximate to a first portion of said core of said parent roll and said second core plug is disposed proximate to a second portion of said core of said parent roll disposed distal from said first portion of said core of said parent roll;

wherein when said first and second core plugs are cooperatively engagable with said first and second portions of said core of said parent roll respectively, said end effector being capable of changing an orientation of said core and said parent roll from a first position to a second position by rotating said parent roll about said axis of rotation; and a platform operably connected to and in complementary engagement with said second longitudinal member and said second core plug, said second core plug being extendable through said platform.

2. The end effector of Claim 1 wherein said platform further comprises at least one conveyor, said conveyor orbiting about a periphery of said platform, said parent roll being conveyable from a position external to said platform to a position upon said platform in cooperative alignment with said first and second core plugs.

3. The end effector of Claim 1 wherein said platform further comprises a pallet.

4. The end effector of Claim 1 wherein said platform is disassociatively disengageable from said end effector.

5. The end effector of claim 4 wherein said second core plug remains in operable engagement with said platform and is disengageable from said second longitudinal member when said platform is disassociatively disengaged from said end effector.

6. The end effector of Claim 1 wherein said platform is cooperatively engageable with said end effector.

7. The end effector of claim 1, wherein said end effector is operably, cooperatively, and pivotably engagable to a motivator, said operably, cooperatively, and pivotably engaged motivator and end effector providing an apparatus for the non-compression transportation of a convolutely wound web material parent roll.

8. The end effector of claim 7 wherein said motivator and said end effector operably, cooperatively, and pivotably engaged thereto moves said parent roll cooperatively engaged thereto from a first position proximate to a papermaking process to a second position proximate to a parent roll converting operation.

9. The end effector of claim 8 wherein said motivator moves said parent roll cooperatively engaged thereto from said a first position proximate to said papermaking process to said second position proximate to said parent roll converting operation via a programmed preset choice of routes.

10. The end effector of claim 7 wherein said end effector rotates radially about an axis of rotation relative to said motivator.

11. The end effector of claim 7 wherein said end effector is fixably engaged to said motivator.

12. The end effector of claim 1 wherein said first radial member is extensible relative to said axis of rotation, wherein said extensible first radial member provides said first longitudinal member with an adjustable displacement, H, relative to said longitudinal axis.

13. The end effector of claim 12 wherein said adjustable displacement, H, is provided by a device selected from the group consisting of linear actuators, pneumatic actuators, hydraulic actuators, mechanical actuators, chain drives, gear drives, rack-and-pinion drives, and combinations thereof.

14. The end effector of claim 1 wherein said first longitudinal member is provided with a length, said length being at least about equal to a diameter of said parent roll, said first longitudinal member preventing the slidable translation of a first layer of said parent roll relative to a succeeding layer of said parent roll.

15. The end effector of claim 1 wherein when said first and second core plugs are cooperatively engagable with said core when said core and said parent roll are disposed horizontally.

16. The end effector of claim 1 wherein when said first and second core plugs are cooperatively engagable with said core when said core and said parent roll are disposed vertically.

17. The end effector of claim 1 wherein said first and second core plugs are cooperatively engageable with a parent roll conveyor, said parent roll conveyor conveying said parent roll from a first position relative to a papermaking process to a second position relative to said papermaking process, said first position being disposed proximate to a papermaking process reel-up section and said first and second core plugs cooperatively engaging said core at said second position.

18. The end effector of claim 1 wherein said second core plug is provided with a profile, said profile providing said second core plug with a first position flush with a surface of said second longitudinal member and a second position wherein said second core plug is extended relative said surface of said second longitudinal member.

19. The end effector of claim 1 wherein said first core plug is fixably attached to a distal end of said first longitudinal member.

20. An end effector for a transport device for the movement of parent rolls of convolutely wound web materials, said end effector comprising:

a frame;

a first radial member operably connected to said frame, said first radial member having a first longitudinal member operably connected thereto and extending therefrom;

a second radial member operably connected to said frame, said second radial member having a second longitudinal member operably connected thereto and extending therefrom said first radial member and said second radial member being rotatable about an axis of rotation;

a first core plug operably connected to said first longitudinal member, said first core plug being extensible from a first position to a second position relative to said first longitudinal member;

a second core plug operably connected to said second longitudinal member, said second core plug being extensible from a first position to a second position relative to said second longitudinal member, said first and second core plugs being capable of cooperative and penetrating engagement with a core of said parent roll when said first core plug is disposed proximate to a first portion of said core of said parent roll and said second core plug is disposed proximate to a second portion of said core of said parent roll disposed distal from said first portion of said core of said parent roll;

wherein when said first and second core plugs are cooperatively engagable with said first and second portions of said core of said parent roll respectively, said end effector being capable of changing an orientation of said core and said parent roll from a first position to a second position by rotating said parent roll about said axis of rotation; and a platform operably connected to and in complementary engagement with said second longitudinal member and said second core plug.

* * * * *